US009489699B2

(12) United States Patent
Barbieri et al.

(10) Patent No.: US 9,489,699 B2
(45) Date of Patent: Nov. 8, 2016

(54) INFLUENCE MAXIMIZATION WITH VIRAL PRODUCT DESIGN

(71) Applicant: Excalibur IP, LLC, Sunnyvale, CA (US)

(72) Inventors: Nicola Barbieri, Barcelona Catalunya (ES); Francesco Bonchi, Barcelona Catalunya (ES)

(73) Assignee: Excalibur IP, LLC, Sunnyvale, CA (US)

( * ) Notice: Subject to any disclaimer, the term of this patent is extended or adjusted under 35 U.S.C. 154(b) by 216 days.

(21) Appl. No.: 13/938,718

(22) Filed: Jul. 10, 2013

(65) Prior Publication Data

US 2015/0019474 A1    Jan. 15, 2015

(51) Int. Cl.
*G06Q 30/02* (2012.01)
*G06Q 50/00* (2012.01)
*G06N 7/00* (2006.01)

(52) U.S. Cl.
CPC .......... *G06Q 50/01* (2013.01); *G06Q 30/0251* (2013.01); *G06N 7/005* (2013.01)

(58) Field of Classification Search
None
See application file for complete search history.

(56) References Cited

U.S. PATENT DOCUMENTS

| 8,332,512 | B1 * | 12/2012 | Wu | G06Q 30/0254 705/319 |
| 9,338,047 | B1 * | 5/2016 | Kunal | G06Q 30/0201 |
| 2009/0307057 | A1 * | 12/2009 | Azout | G06Q 30/02 705/7.29 |
| 2012/0005238 | A1 * | 1/2012 | Jebara | G06Q 10/04 707/798 |
| 2013/0144695 | A1 * | 6/2013 | Nanavati | G06Q 30/02 705/14.4 |
| 2014/0006176 | A1 * | 1/2014 | Gudlavenkatasiva | G06Q 30/02 705/14.73 |

OTHER PUBLICATIONS

Aral "Creating Social Contagion Through Viral Product Design: A Randomized Trial of Peer Influence in Networks" Management Science, vol. 57, No. 9, Sep. 2011, pp. 1623-1639.*
Chatterjee "Drivers of new product recommending and referral behaviour on social network sites," International Journal of Advertising, 2011.*
Qualtrics "Conjoint Analysis: Explaining Full Profile and Self Explicated Approaches," PC-MDS documentation of MDPREF, Nov. 1, 2011.*
Henneberry, "How to Find Influential People with Social Media" Social Media Examiner, Oct. 17, 2012.*
Kohavi "Practical Guide to Controlled Experiments on the Web: Listen to Your Customers not to the HiPPO" ACM, 2007.*
"Chen," Efficient Influence Maximization in Social Networks, KDD, 2009.*

(Continued)

*Primary Examiner* — Stanley K Hill
*Assistant Examiner* — David H Kim
(74) *Attorney, Agent, or Firm* — James J. DeCarlo; Greenberg Traurig, LLP

(57) ABSTRACT

The disclosure includes use of a feature-aware propagation model to identify one or more features of a product and one or more person(s), or members of a social network, to target, or user, for marketing the product having the identified features. The one or more person(s) identified using the model may be the person(s), or member(s), of a social network determined to have a maximum capability, relative to other members of the social network, for influencing the members of the social network in adopting, e.g., purchasing, a product having the identified features. In addition, parameters of the model may be determined using information about the social network, user preferences, and the products and features of the products.

21 Claims, 6 Drawing Sheets

(56) References Cited

OTHER PUBLICATIONS

Barbieri, et al. "Influence Maximization with Viral Product Design"; 9 pages, 2014.
P. V. S. Balakrishnan and V. S. Jacob. "Genetic algorithms for product desian." Manage. Sci., 42(8):1105-1117, 1996.
N. Barbieri, F. Bonchi, and G. Manco. "Topic-aware socal infuence propagaton modes." In ICDM, 2012; 10 pages.
A. Belloni, R. Freund, M. Selove, and D. Simester. Optimizing product line designs: Efficient methods and comparisons Management Science, 54(9):1544-1552, 2008.
A. Berger. The improved iterative scalina algorithm: A gentle introduction, 1997; 4 pages. http://www.cs.cmu.edu/~aberger/pdf/scaling.pdf.
W. Chen, C. Wang, and Y. Wang. Scalable influence maximization for prevalent viral marketing in large-scale social networks. In KDD, 2010; 10 pages.
M. Das, G. Das, and V. Hristidis. Leveraging collaborative tagging for web item design. In KDD, 2011; 9 pages.
P. Domingos and M. Richardson. Mining the network value of customers. In KDD, 200; 10 pages, 2001.
R. Fagin, R. Kumar, and D. Sivakumar. Comparing top k lists. IBM Almaden Research Center; In SODA, 2003; 26 pages.
A. Goyal, F. Bonchi, and L. V. S. Lakshmanan. Learning influence probabilities in social networks. In WSDM, 2010; 10 pages.
A. Goyal, F. Bonchi, and L. V. S. Lakshmanan. A data-based approach to social influence maximization. PVLDB, 5(1):73-84, 2011.
P. Green and V. Rao. Conjoint measurement for quantifying judgmental data. Journal of Marketing Research, 8(3):355-363, 1971.
P. E. Green and V. Srinivasan. Conjoint Analysis in Consumer Research: Issues and Outlook, The Journal of Consumer Research, 5(2):103-123, 1978.
D. Gunnec and S. Raghavan. Integrating social network effects in the share-of-choice problem. Unpublished working paper. 32 pages http://terpconnect.umd.edu/~raghavan/preprints/snesoc.pdf.
D. Kempe, J. M. Kleinberg, and E. Tardos. Maximizing the spread of influence through a social network. In KDD, 2003; 10 pages.
M. Kimura and K. Saito. Tractable models for information diffusion in social networks. In PKDD, 2006; 13 pages.
R. Kohli and R. Krishnamurti. A heuristic approach to product design. Management Science, 33(12):1523-1533, 1987.
R. Kohli and R. Krishnamurti. Optimal product design using conjoint analysis: Computational complexity and algorithms. European Journal of Operational Research, 40(2):186-195, 1989.
J. Leskovec, A. Krause, C. Guestrin, C. Faloutsos, J. VanBriesen, and N. S. Glance. Cost-effective outbreak detection in networks, In KDD, Jun. 2007; 31 pages.
X. Lin, Q. Mei, J. Han, Y. Jiang, and M. Danilevsky. The joint inference of topic diffusion and evolution in social communities. In ICDM, 2011; 10 pages.
L. Liu, J. Tang, J. Han, M. Jiang, and S, Yang. Mining topic-level influence in heterogeneous networks. In CIKM, 2010; 10 pages.
M Miah, G. Das, V. Hristidis, and H. Mannila. Determining attributes to maximize visibility of objects. IEEE Trans. on Knowl. and Data Eng., 21(7):959-973, Jul. 2009.
G. L. Nemhauser, L. A. Wolsey, and M. L. Fisher. An analysisof approximations for maximizing submodular set functions—i. Mathematical Programming, 14(1):265-294, 1978.
K. Nigam. Using maximum entropy for text classification. In in JCAI-99 Workshop on Machine Leaning for Information Filtering, pp. 61-67, 1999.
M. Richardson and P. Domingos. Mining knowledge-sharing sites for viral marketing. Dep't of Consumer Science and Engineering. In KDD, 2002; 10 pages.
K. Saito, R. Nakano, and M. Kimura. Prediction of information diffusion probabilities for independent cascade model. In KES, 2008; 9 pages.
Aral, S. and Walker, D. Creating social contagion through viral product design: A randomized trial of peer influence in networks. Management Science. Forthcoming; vol. 57, No. 9, Sep. 2011, pp. 1623-1639.
Aral, S. & Walker, D. 2011. "Forget Viral Marketing: Make the Product Itself Viral." Harvard Business Review, 89(6); June: 34-35; 2 pages.
A. Singh, A. Guillory, and J Bilmes. On bisubmodular maximization. Journal of Machine Learning Research—Proceedings Track, pp. 1055-1063, 2012.
J. Tang, J. Sun, C. Wang, and Z. Yang, Social influence analysis in large-scale networks. In KDD, 2009; 9 pages.
S. Tsafarakis and N. Matsatsinis. Designing optimal products: Aigorithms and systems. In Marketing Intelligent Systems Using Soft Computing, vol. 258 of Studies in Fuzziness and Soft Computing, pp. 295-336, 2010; 46 pages including cover.
J. Wend, E.-P. Lim, J. Jiang, and Q. He. Twitterrank: finding topic-sensitive infuential twitterers. In WSDM, 2010; 10 pages.
R. Xiang, J. Neville, and M. Rogati. Modeling relationship strength in online social networks. In WWW, 2010; 10 pages.

\* cited by examiner

---
Algorithm 1: Learning the parameters of F-TM
---
Input : Social graph $G = (V, E)$, propagation log data $\mathbb{D}$
Output: The set of all parameters of F-TM: social influence $b_{i,j}$, part-worth utilities $u_f^i$, and hurdle $h_i$.
---
1 $init(\Theta)$; //Random initialization of parameters
2 repeat
3     forall the $v_i \in V$ do
4        forall the $v_j \in N_{out}(v_i)$ do
5           Solve $\frac{\partial B}{\partial \beta_{i,j}} = 0$ for $\beta_{i,j}$
6           Set $b_{i,j} \leftarrow max(0, b_{i,j} + \beta_{i,j})$
7        end
8        forall the $f \in \mathcal{F}$ do
9           Solve $\frac{\partial B}{\partial v_f^i} = 0$ for $v_f^i$
10          Set $u_f^i \leftarrow u_f^i + v_f^i$
11        end
12        Solve $\frac{\partial B}{\partial \eta_i} = 0$ for $\eta_i$
13        Set $h_i \leftarrow max(0, h_i + \eta_i)$
14    end
15 until log likelihood converge;
---

FIGURE 3

```
Algorithm 2: MaxInf_VPD alternating optimization
Input  : Social graph G = (V, E), budget K ∈ N, and the
         set of all parameters of F-TM: social influence b_{i,j},
         part-worth utilities u_f^i, and hurdle h_i.
Output : A seed set S, where |S| = k, and a subset of
         features H ⊆ F.
1  S, H, H_old ← ∅
2  (v_0^i, f^i) ← argmax_{(v_i, f) ∈ V × F} σ({v_i}, {f})
3  S ← S ∪ {v_0^i}, H ← H ∪ {f^i}
4  σ_curr ← σ(S, H)
5  iterate ← true
6  it ← 0
7  while (iterate) do
8      if (it mod 2 = 0 ∧ |S| < k) then
9          [s, σ_curr] ← greedySelection(S, H)
10         S ← S ∪ {s}
11     else
12         H_old ← H
13         [H, σ_curr] ← updateFeatureSet(S, H)
14         if (|S| = k ∧ H_old = H) then
15             iterate ← false
16         end
17         S' ← argmax_{S' ⊆ V, |S'|≤|S|} σ(S', H)
18         if (σ(S', H) > σ_curr) then
19             S ← S'
20             σ_curr ← σ(S', H)
21         end
22     end
23     it ← it + 1
24 end
```

FIGURE 4

INFLUENCE MAXIMIZATION WITH VIRAL PRODUCT DESIGN

FIELD OF THE DISCLOSURE

The present disclosure relates to product design and viral marketing, and more particularly to modeling a viral process of product adoption on the basis of social influence and the features of the product.

BACKGROUND

Product design relates to activities, such as market share for testing and/or estimation of customer utilities for a given set of product features, are aimed at designing a new product, with the objective of maximizing the number of customers adopting the product. Viral marketing comprise marketing techniques that take advantage of peer influence among customers, for example, using social media and communication platforms, whereby a social network, such as an existing social network, may be exploited to increase brand awareness or achieve other marketing objectives, e.g., product sales, through selfreplicating viral processes.

SUMMARY

The present disclosure seeks to address failings in the art and to incorporate product design in viral marketing. In accordance with one or more embodiments, influence is maximized with a viral product design. In accordance with one or more such embodiments, a set of users may be considered, together with the relationships among the users in the set, such as in the case of the social network, and together with product feature utilities, e.g., user interest in the feature(s).

Embodiments of the present disclosure provide influence maximization (MaxInf) and share-of-choice (SoC) variants that take into account differences in influence levels among users, e.g., a user may have more influence over one or more users and less influence over another one or more users, and further takes into account differences in product utilities, or levels of importance, of one or more product features for each user. In accordance with one or more such embodiments, differences in influence levels among users is considered in selecting a set of initial users from a social network that are more likely to influence the largest number of users in the social network, e.g., the initial set of users determined as having the greatest spread of influence in a social network relative to others users in the social network. In addition and in accordance with one or more such embodiments, part-worth utilities, each of which may be associated with a user and a product feature and may be used to measure importance to the user of the product feature, a hurdle for each user, which hurdle may be used as a product adoption equilibrium measure for the user, and an influence strength for each directed link between two users, which influence strength may be a measure of a strength of influence that one user has over another user, are learned jointly, by analyzing a database of past propagation in a social network, where each product is described by a set of features. In accordance with one or more embodiments of the present disclosure, a viral marketing campaign for a product may be determined by determining both a seed set of users as influencers and a set of product features for the product.

In accordance with one or more embodiments, a method is provided, the method comprising using, by at least one computing system, a feature-aware propagation model having a set of model parameters in identifying a combination of a seed set of users that are members of a social network for influencing other users of the social network and a product feature set for a product, the combination of the user seed and product feature sets determined to have a greater likelihood to maximize adoption of the product having the product feature set by members of the social network, the greater likelihood being relative to at least one other combination of user seed set and product feature set considered; and identifying, by the at least one computing system, the combination of the user seed and product feature sets using the feature-aware propagation model.

In accordance with one or more embodiments a system is provided, which system comprises at least one computing device comprising one or more processors to execute and memory to store instructions to use a feature-aware propagation model having a set of model parameters in identifying a combination of a seed set of users that are members of a social network for influencing other users of the social network and a product feature set for a product, the combination of the user seed and product feature sets determined to have a greater likelihood to maximize adoption of the product having the product feature set by members of the social network, the greater likelihood being relative to at least one other combination of user seed set and product feature set considered; and identify the combination of the user seed and product feature sets using the feature-aware propagation model.

In accordance with yet another aspect of the disclosure, a computer readable non-transitory storage medium is provided, the medium for tangibly storing thereon computer readable instructions that when executed cause at least one processor to use a feature-aware propagation model having a set of model parameters in identifying a combination of a seed set of users that are members of a social network for influencing other users of the social network and a product feature set for a product, the combination of the user seed and product feature sets determined to have a greater likelihood to maximize adoption of the product having the product feature set by members of the social network, the greater likelihood being relative to at least one other combination of user seed set and product feature set considered; and identify the combination of the user seed and product feature sets using the feature-aware propagation model.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an overview process flow in accordance with one or more embodiments of the present disclosure.

FIG. 2 provides a component overview in accordance with one or more embodiments of the present disclosure.

FIG. 3 provides an example of a model parameter learning process in accordance with one or more embodiments of the present disclosure.

FIG. 4 provides an example of a process flow for identifying a seed and feature set combination in accordance with one or more embodiments of the present disclosure.

DETAILED DESCRIPTION

Figure 1:
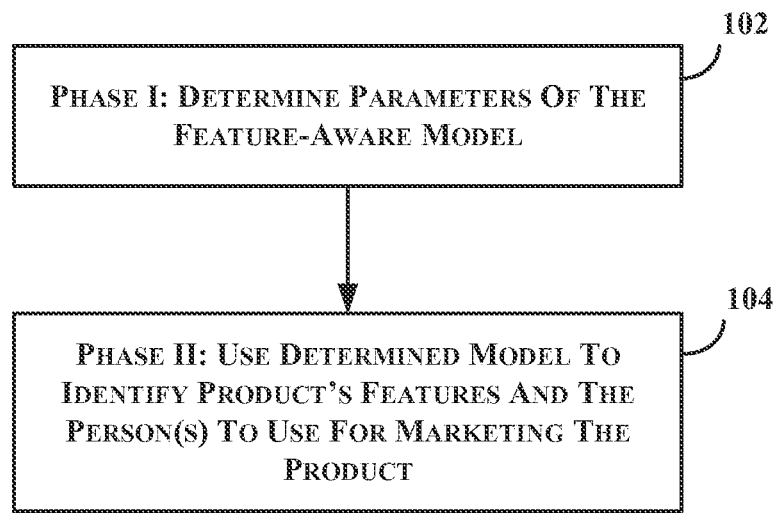

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "social network" refers generally to a network of entities, such as corporations, organizations, etc., and/or individuals, such as acquaintances, friends, family, colleagues, or co-workers, coupled via a communications network or via a variety of sub-networks. Potentially, additional relationships may subsequently be formed as a result of social interaction via the communications network or sub-networks, and/or other forms of interactions A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

By way of a non-limiting example, a social network may include individuals with similar experiences, opinions, education levels or backgrounds. Subgroups may exist or be created according to user profiles of individuals, for example, in which a subgroup member may belong to multiple subgroups. An individual may also have multiple associations within a social network, such as for family, college classmates, or co-workers.

By way of a further non-limiting example, an individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so-called "virtual persons." An individual's social network may be represented in a variety of forms, such as visually, electronically or functionally. For example, a "social graph" or "socio-gram" may represent an entity in a social network as a node and a relationship as an edge or a link.

In accordance with one or more embodiments, any type of social network may be used in generating model parameters, generating a set of seed users for influencing other members in propagating and/or adoption of a product, etc. Additionally and in accordance with one or more embodiments, a relationship between two users of a social network, which may also be referred to herein as an arc between two nodes of a social network, may represent an influence, e.g., a product adoption influence, that one member has over another social network member, which influence may be represented as a numeric measure of strength of influence.

The detailed description provided herein is not intended as an extensive or detailed discussion of known concepts, and as such, details that are known generally to those of ordinary skill in the relevant art may have been omitted or may be handled in summary fashion.

In general, the present disclosure includes an influence maximization with viral product design system, method and architecture. Certain embodiments of the present disclosure will now be discussed with reference to the aforementioned figures, wherein like reference numerals refer to like components.

One or more embodiments of the present disclosure use a feature-aware propagation model to identify one or more features of a product and one or more person(s), or members of a social network, to target, or user, for marketing the product having the identified features. The one or more person(s) identified using the model may be the person(s), or member(s), of a social network determined to have a maximum capability, relative to other members of the social network, for influencing the members of the social network in adopting, e.g., purchasing, a product having the identified features. In addition, parameters of the model may be determined using information about the social network, user preferences, and products and features of the products.

FIG. 1 provides an overview process flow in accordance with one or more embodiments of the present disclosure. At step 102, in a phase 1, one or more parameters of the feature-aware model are determined. The model determined in phase 1, or step 102, may be used in phase 2, or step 104, to identify a product having one or more features and identify one or more person's to use for marketing the product.

In accordance with one or more embodiments, the feature-aware model models the process of product adoption by considering social influence and part-worth utilities for the features of the items, e.g., products, being propagated. In accordance with one or more such embodiments, a social graph, which may be represented as G=(V,E), with a plurality of nodes V={$v_1, v_2, \ldots, v_n$}, each node corresponding to a member of a social network represented by the social graph. In accordance with this representation, the social graph G comprises a set of nodes V, where each node $v_i$ may be used to represent the $i^{th}$ user, or member, of the social graph G and a set of edges, or arcs, between two users. Each arc may be represented as $(v_j, v_i) \in E$, has an associated strength of the influence exerted by a user $v_j$ on another user $v_i$, which strength of influence may be represented as $b_{j,i} \in \mathbb{R}^+$, where $\mathbb{R}^+$ represents the set of positive real numbers. In other words, in accordance with one or more embodiments, a strength of influence exerted by a user $v_j$ on another user $v_i$, which strength of influence may be denoted as $b_{j,i}$, may be a positive real number.

In accordance with one or more embodiments, given a social network G=(V,E), where a link $(v_j, v_i) \in E$ means that $v_j$ may potentially influence $v_i$, and given a budget k of seed nodes/users in the social network, the k seed nodes in the network are identified, such that by activating the seed nodes, where activation may represent adoption of a product, an expected number of nodes that eventually get activated may be maximized, according to a probabilistic propagation model, such as the feature-aware model used in accordance with one or more embodiments, which governs how influence propagates through the network.

In accordance with one or more embodiments, an adoption model assumes that a customer $v_i$ decides to adopt a product if the sum of utilities exceeds the customer's hurdle, which may be expressed as follows:

$$\sum_{f \in F} \sum_{l} x_{f,l} \cdot u_{f,l}^i \geq h_i, \quad \text{Expr. (1)}$$

where $x_{f,l}$ denotes an indicator variable, which has a value of one if the level l has been selected for the feature f and zero otherwise, and which may be denoted as $x_{f,l} \in \{0,1\}$, $u_{f,l}^i$ represents the part-worth utility for customer $v_i$ if level l is chosen for feature $f \in F$, and $h_i$ represents a given hurdle for customer, or user, $v_i$ which represents the utility value of equilibrium between making are not making a purchase of product p. In accordance with one or more embodiments, an assumed adoption model is that a customer, or user, decides to adopt a product when the sum of utilities exceeds the customer's hurdle, $h_i$. In other words, it may be assumed that a customer, or user, $v_i$ will decide to adopt a product with one or more feature(s), each of which has a feature level, e.g., one example of a feature might be a display and a level might be a specific size of the display, if the sum of the user's part-worth utilities associated with each feature level of each feature in a set of features selected for the product exceeds the user's hurdle, or adoption equilibrium measure, determined for the user. By way of a further non-limiting example, a feature, such as a laptop screen, may have multiple levels, such as 10 inch, 15 inch, etc., from which embodiments may choose.

In accordance with one or more embodiments, in a universe of possible product features F, a set of features of a given product p may be represented as F(p), and a part-worth utility for a user $v_i$ and a feature f may be denoted as $u_f^i \in \mathbb{R}$ where $\mathbb{R}$ represents the set of real numbers. A feature may contribute positively for some users, while its contribution may be negative for others.

In accordance with one or more embodiments, the feature-aware model, or the feature-aware threshold model, may be a variant of linear threshold (LT) model, in which at a given timestamp, each node is either active, e.g., a customer that have already purchased the products, or inactive, and each node's tendency to become active increases monotonically as more of its neighbors become active. In accordance with one or more embodiments, an active node remains active, such that it does not revert back to an inactive state. Additionally and in accordance with one or more embodiments, each node $v_i$ may be influenced by each neighbor $v_j$, and the sum of incoming weights for $v_i$ is no more than 1. Initially, each node $v_i$ selects a threshold $\theta_i$ uniformly random from [0, 1]. If at time t, a total weight from the active neighbors of an active node $v_i$ is at least $\theta_i$, $$\sum_{\substack{(v_j, v_i) \in E \\ v_j \text{ is active}}} b_{j,i} \geq \theta_i, \quad \text{Expr. (2)}$$

then $v_i$ becomes active at timestamp t+1.

In accordance with one or more embodiments, in a feature-aware model, peer influence and feature utilities cooperate, while a hurdle is used as a reduction of a part-worth utility. In accordance with one or more embodiments, a feature-aware model is probabilistic, such that initially each node $v_i$ pics a threshold $\theta_i$ uniformly at random from [0, 1]. The time unfolds in discrete steps. For a given product p, the set of newly-activated nodes at time t is denoted by $D_p(t)$, while $C_p(t) = \cup_{t' \leq t} D_p(t')$ represents the set of all nodes that adopted p so far. In accordance with one or more embodiments, product adoption may be modeled using a logistic function. At time t, the probability that user $v_i$ adopts product p may be expressed as:

$$Pr(p \mid i, t) = \frac{\exp\{\psi_t^i(p)\}}{1 + \exp\{\psi_t^i\}}, \quad \text{Expr. (3)}$$

where $$\psi_t^i(p) = \sum_{\substack{(v_j, v_i) \in E \\ v_j \in C_p(t)}} b_{j,i} + \sum_{f \in F(p)} u_f^i - h_i \quad \text{Expr. (4)}$$

By virtue of expression 4, the probability that user $v_i$ adopts product p depends on social influence on the user, which is represented by the first component to the right of the equals sign, the part-worth utilities of the feature levels of the product, which is also referred to as user preferences for product feature levels and is represented by the middle component, and the hurdle, or adoption equilibrium, which is represented by the rightmost component. Additionally and by virtue of expression 4, the probability determined in expression 3 increases as the gap increases between the hurdle and the combination of the social influence and user preferences and the hurdle. Conversely, the probability determined in expression 3 decreases as the gap decreases between the hurdle and the combination of the social influence and user preferences.

In accordance with one or more embodiments, an activation probability is considered to be zero if the node $v_i$ has no active neighbors, i.e., no members having influence on the node have adopted the product, at the time considered, or if F(p) is empty. At time t if $Pr(p|i,t) \geq \theta_i$, that is, the probability is at least equal to the threshold for adopting the product p, $v_i$ adopts product p at time t+1. The diffusion may be considered to be complete when no new nodes may be activated.

In accordance with one or more embodiments, the feature-aware model has a set of parameters represented by $\Theta$, which parameters may comprise social influence, social influence, part-worth utilities and hurdle information. In accordance with one or more embodiments, social influence strength, part-worth utilities and hurdles may be learned from past observations of users in a social network.

Figure 2:
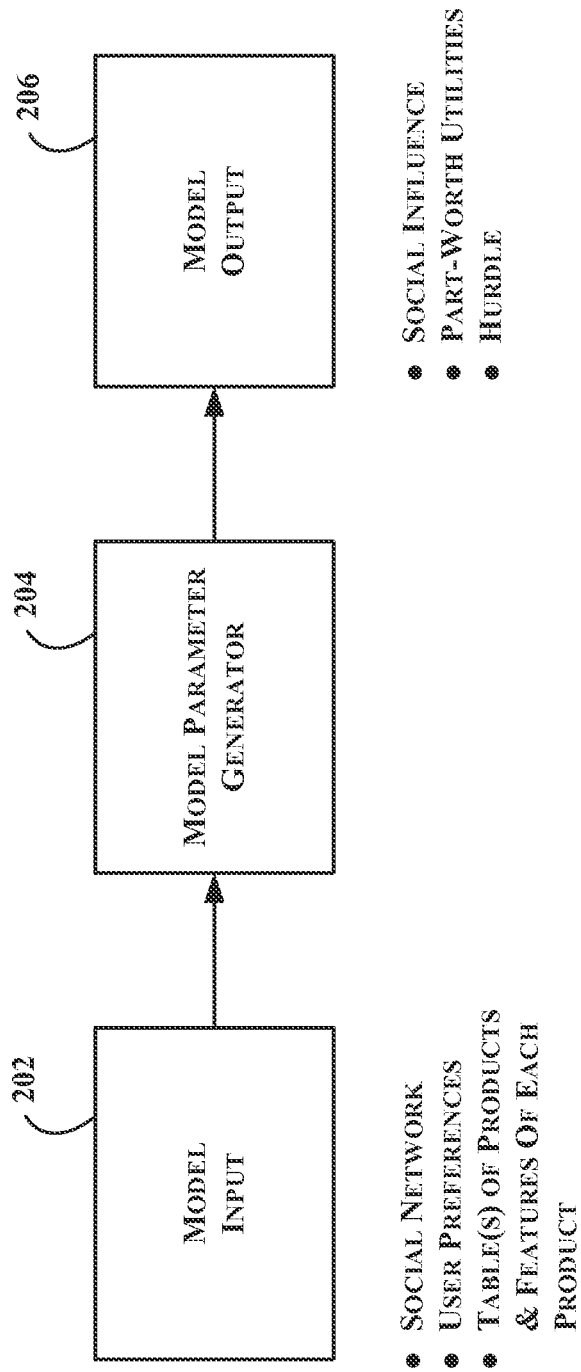

FIG. 2 provides a component overview in accordance with one or more embodiments of the present disclosure. A model parameter generator 204, which may be implemented by one or more computer devices, such as and without limitation a server and/or user computing device, takes input 202 and generates output 206, which comprises the model parameters such information as a social network, user preferences and product information, which may be in the form of product tables identifying features of each product.

The inputs 202 may comprise a directed social graph G=(V,E), a log of past product propagations, or adoptions, $\mathcal{D}$, and a list of features F(p) for each product p. The log $\mathcal{D}$ may include a relation (User, Product, Time), where each tuple ⟨i, p, t⟩ indicates that a user $v_i$ adopted, e.g., purchased, recommended, etc., the product p at time t. In accordance with one or more embodiments, the product p may include information for identifying the product's set of features, which information may be used in determining a given user's part-worth utilities associated with the one or more features. In at least one embodiment, a projection of $\mathcal{D}$ over the user column is contained in V, a projection of $\mathcal{D}$ over the product column corresponds the universe of products P, and the time column is contained in [$t_0$, T]. A time at which user $v_i$ adopts a product p may be denoted by $t_p(i)$. If user $v_i$ does not adopt product p, the time $t_p(i)$ may be updated to be $t_p(i)$=T+1.

In accordance with one or more embodiments, the output of model parameter generator 204 comprises a set of parameters $\Theta$ of a feature aware model the parameters including an influence strength $b_{i,j}$ for each arc, connection, relationship, etc. ($v_i$, $v_j$)∈E), A part-worth utility $u_f^i$ for each user $v_i$∈V and each feature f∈F, and a hurdle $h_i$ for each user $v_i$∈V. Assuming for the sake of example, each propagation trace is independent from other propagation traces, the likelihood of the data given the model parameters $\Theta$ may be expressed as $$\mathcal{L}(D; \Theta) = \sum_{p \in P} \log \mathcal{L}(D_p; \Theta),$$

where $$\mathcal{L}(D; \Theta) = \prod_{i: v_i \in V} P_r(p \mid i, t_p(i))^{\delta(i,p)} \cdot (1 - P_r(p \mid i, t_p(i)))^{1-\delta(i,p)}$$

and $\mathcal{D}_p$ represents the propagation of product p, e.g., the selection of the relation $\mathcal{D}$ where the product is p. Additionally, $\delta(i,p)=1$ if $v_i$ adopted product p and is equal to zero otherwise.

In accordance with one or more embodiments, the optimization problem may be expressed as follows:

$$\text{Maximize}_{\Theta} \log(D; \Theta)$$

$$\text{subject to } b_{i,j} \geq 0 \ \forall \ (v_i, v_j) \in E$$

$$\text{and } h_i \geq 0 \ \forall \ v_i \in V \ (v_i, v_j) \in V$$

In accordance with one or more embodiments, the optimization, learning problem may be solved using an iterative scaling approach, using which an improvement $\Delta$ of the parameters $\Theta$ is sought such that a higher log likelihood may be obtained, which may be expressed as follows:
$\mathcal{L}(\mathcal{D};\Theta+\Delta) \geq \mathcal{L}(\mathcal{D};\Theta)$ By way of a non-limiting example, the change in log likelihood, which may be expressed as $\mathcal{B} = \mathcal{L}(\mathcal{D};\Theta+\Delta) - \mathcal{L}(\mathcal{D};\Theta)$, may be optimized with respect to $\Delta$, where $\Delta$ comprises a set of improvements for all parameters, e.g., a social influence improvement $\beta_{i,j}$ for each arc $(v_i, v_j)$∈E, a hurdle improvement $\eta_i$ for each node $(v_i)$∈V, and a part worth utility improvement $\upsilon_f^i$ for each node $(v_i)$∈V and f∈F, such that $\Theta+\Delta$ represents $b_{i,j}:=b_{i,j}+\beta_{i,j}$, $h_{i}:=h_i+\eta_i$ and $u_f^i:=u_f^i+\upsilon_f^i$.

Using the improved iterative scaling approach, in accordance with one or more embodiments, a set of updates, or improvements, $\Delta$ of the parameters $\Theta$, which updates maximize a lower bound on the improvement of the likelihood, may be determined. FIG. 3 provides an example of a model parameter learning process in accordance with one or more embodiments of the present disclosure.

In the example process flow shown in FIG. 3, $N_{in}(v_i)$ denotes the set of nodes which may potentially influence the node $v_i$, e.g., $N_{in}(v_i)=\{v_j \in V | (v_j,v_i) \in E\}$ and $N_{out}(v_i)$ denotes the set of nodes which may be influenced by $v_i$. Additionally and for a given product p and a timestamp t, $N_{in}^p(v_i)=C_p(t_p(i)) \cap N_{in}(v_i)$ may denote the set of nodes which are exerting influences on $v_i$ for product p at time t. Moreover, let $\lambda_p^i = |N_{in}^p(v_i)| + |F(p)| + 1$.

By way of a non-limiting example, the timestamp may be used to identify which user(s) exert influence over one or more other users. By way of a further non-limiting example, assuming that adoption of a product comprises purchasing the product, if a given member of a social network purchases the product, the timestamp associated with each member's purchase may be used to identify the other member(s) of the social network that purchased the product before the given member; the member(s) identified as purchasing the product before the given member may be considered to have exerted influence over the given member.

In accordance with one or more embodiments, by exploiting the inequality −log x ≥ 1−x and applying Jensen's inequality, a lower bound on the improvement of the likelihood may be obtained. Using the process shown in FIG. 3, the set of updates, or improvements, $\Delta$ of the parameters $\Theta$ that maximizes such a lower bound on the improvement of the likelihood may be computed. In the process shown in the example of FIG. 3, lines 3 to 14 are repeated for all nodes $v_i$ in the set of nodes V until a log likelihood convergence, e.g. an optimized set of model parameters Θ, is obtained. At line 3, a node $v_i$ is selected from the set of nodes V, and the set of nodes influenced by the selected node $v_i$ are identified. A strength of social influence improvement $\beta_{i,j}$ is determined for each arc $(v_i,v_j) \in E$ at lines 4 to 7, a hurdle improvement $\eta_i$ is determined for each node $(v_i) \in V$ at lines 8 to 11, and a part-worth utility improvement $v_f^i$ is determined for each node $(v_i) \in V$ and $f \in F$ at lines 12 to 13.

By way of a non-limiting example, in the algorithm shown in FIG. 3, $$\frac{\partial B}{\partial(\cdot)} = 0$$

may be computed for each improved iterative scaling parameter by applying Newton Raphson, to obtain an incremental update. It is noted that $b_{i,j} + \beta_{i,j}$ and/or $h_i + \eta_i$ may result negative. In such a case and in accordance with one or more embodiments, due to monotonicity of the activation function with respect to $b_{i,j}$ and $h_i$, a lowest legal value that meets a non-negative constraint is zero.

In accordance with one or more embodiments, a process such as that shown in FIG. 3 may be used to define the set of model parameters Θ of a feature-aware model in a first phase, which is shown at step 102 of FIG. 1. In accordance with one or more embodiments, the set of model parameters Θ may be used to identify features of a product and the person(s), e.g., a seed set of k users, to use for marketing the product to maximize influence with viral product design. In accordance with one or more embodiments, a solution to a maximum influence problem includes a seed set of users comprising a number, k, of users. Herein, a maximum influence determination may be referred to as MAXINF_VPD, and may be defined over the feature-aware propagation model. The input to the problem may include the social graph and the parameters of the model Θ, which parameters may be learned in a phase 1 discussed herein.

By way of a non-limiting example, MAXINF_VPD may use a directed graph G=(V,E), parameters Θ of a feature-aware propagation model, F-TM, which parameters may comprise an influence strength $b_{j,i}$ for each arc $(v_j,v_i) \in E$, a part-worthy utility $u_f^i$ for each user $v_i \in V$ and feature $f \in F$, and a hurdle $h_i$ for each user $v_i \in V$ to determine a set of nodes $S \in V$ where the number of nodes in the set, or |S|, is less than or equal to a desired number k nodes, which desired number of nodes may be considered a budget, i.e., |S|≤k, and to determine a set of features $H \subset F$ for a product, which determined set of nodes $S \in V$ and set of features $H \subset F$ maximize a spread, denoted as σ(S,H), of the product, e.g., maximizes adoption of the product by members of the social network.

In accordance with one or more embodiments, in the MAXINF_VPD problem, the set of users $S \subseteq V$ and the set of features $H \subseteq F$ may be jointly selected, such that the expected viral spread of the viral marketing campaign started with nodes S for a new product described by its set of features H may be maximized. In accordance with one or more embodiments, a procedure which alternates local greedy choices for the update of the seed set in the feature set may be used. FIG. 4 provides an example of a process flow for identifying a seed and feature set combination in accordance with one or more embodiments of the present disclosure.

In accordance with the example shown in FIG. 4, a pair of singletons ⟨v, f⟩ in the Cartesian product V×F that maximizes a spread may be determined, at line 2 of FIG. 4. Then, in an iterative manner, e.g., iteration by iteration, a procedure of greedy seed selection and feature update are alternated such that, at a given iteration (i) an improvement of the objective function may be generated by forcing one of the two following inequalities to hold:

$$\sigma(S^{(i)}, H^{(i)}) \leq \sigma(S^{(i+1)}, H^{(i)}) \quad \text{Expr. (5)}$$

$$\sigma(S^{(i)}, H^{(i)}) \leq \sigma(S^{(i)}, H^{(i+1)}) \quad \text{Expr. (6)}$$

In expression 5, with a set of product level features remaining constant, another user is added to the seed set S at iteration i+1, such that the spread at iteration i+1 is at least equal to the spread that iteration i. In expression 6, with the set of users remaining constant, a product level feature is added at iteration i+1, such that the spread at iteration i+1 is at least equal to the spread that iteration i.

In accordance with one or more embodiments, when the feature set H is fixed, if the size of the seed set S is increased, the inequality in expression 5 holds due to the monotonicity in S. By way of a non-limiting example, the step in which a greedy selection of the next node to add to the seed set, line 9 of FIG. 4, may have (1-1/e) quality guarantees, due to submodularity. In accordance with one or more embodiments, where the feature set H is updated, one or more heuristic techniques for generating a solution such that expression six is satisfied may be adopted. The one or more heuristic techniques may include alternatives for performing the updateFeatureSet(S, H) procedure at line 13 of FIG. 4. By way of a non-limiting example, the update procedure provides the best set, as output, which can be obtained by performing one addition/removal of a feature to/from the current feature set. Although the procedure is expected to converge naturally to a limited number of features, as the algorithm will reach a point in which no local change can improve the spread, a constraint, e.g., ≤10, of the size of the selected feature set may be imposed to make the interpretability of the feature set provided. It should be apparent that embodiments of the present disclosure may use any number of product feature sets, iterations, etc. It is also possible to penalize large feature sets, such as and without limitation imposing a penalty, which may be determined using $(|H|-1)^2$. If the number of features exceeds a "desired" length of the feature set, e.g., a feature set length often.

To further illustrate, using the algorithm example of FIG. 4, updates are made to the seed set of users and the feature set of a product until the size of the seed set reaches a desired number of users, e.g., a budget size k of the seed set. As shown at lines 8, 14 and 14 of FIG. 4, the iterative process may be terminated when a desired budget size is reached and the update to the feature set yields the same feature set as before the iteration. As illustrated by line 8, with each iteration, the algorithm alternates between selecting a seed set user and selecting a product feature.

In an iteration in which a seed set user is selected, each user not already a member of the seed set may be added to the seed set for purposes of determining the spread for a potential seed set including the new user. Each new user may be considered so that a spread is determined for each new user. The new user that provides the greatest increase in the spread relative to the other new users is selected as a member of the seed set in the current iteration.

An approach similar to that used to update the seed set may be used to update the feature set in an iteration in which the feature set is being updated. More particularly, each feature of the product not already a member of the feature set may be added to the feature set to determine the spread for a potential feature set including the new feature. Each new feature may be considered so that a spread is determined for each new feature. The new feature that provides the greatest increase in the spread relative to the other new features considered is selected as a member of the feature set in the current iteration.

As an alternative approach, in an iteration in which the feature set is updated, an existing feature in the feature set may be removed or a new feature may be added, and a determination of whether to add or remove a feature may be based on which option achieves a larger spread. In other words, an "add feature" spread may be determined and a "delete feature" spread may be determined. The "add feature" spread may be the largest spread determined for a new feature, as described above. If the "add feature" spread is larger than the "delete feature" spread, a new feature, e.g., the new feature that provided the greatest increase in spread, is added. Conversely, if the "add feature" spread is less than the "delete feature" spread, an existing feature is removed from the feature. The feature that is removed from the feature set may be the feature set whose removal yielded the greatest spread, which greatest spread may be the "delete feature" spread. To determine the "delete feature" spread, each existing feature of the feature set might be removed from the set for purposes of determined a resulting spread. The largest spread of the spreads determined by removing each feature from the set may be used as the "delete feature" spread, and the feature whose removal yields the greatest spread relative to the other existing features of the set may be feature that is removed from the set if feature removal is selected over feature addition in the iteration.

As yet another alternative approach, a hybrid of the two above approaches may be used, such that a new feature is added and then a determination is made whether to remove an existing feature, e.g., an existing feature other than the new feature added to the feature set in the current iteration. The determination may depend on whether removal of any of the existing features increases the spread. By way of a non-limiting example, with the exception of any new feature added in the current iteration, each existing feature in the feature set is removed and a spread is determined for the feature set that includes the newly-added feature, e.g., the feature added to the feature set in the current iteration, and excludes the removed feature. If one of the spreads yields a larger spread than the spread associated with the feature set that includes all of the existing features, including the newly-added feature, the feature whose removal yielded the larger spread may be removed from the feature set in the current iteration.

In accordance with one or more embodiments, once a feature set is updated, a MAXINF greedy algorithm may be applied with a feature-aware model, F-TM model, a budget of users, e.g., $|S^{(t)}|$, and a fixed feature set, to check whether a better selection of the exists, e.g., see line 17 of algorithm shown in the example of FIG. 4.

To further illustrate and in accordance with lines, assume that the current seed set has three users and the current iteration updated the feature set, e.g., added or deleted a feature, lines 17 to 20 in FIG. 4 examine other seed sets having three users other than the users in the current seed set to determine whether another seed set of three users yields a greater spread than the current seed set of users. If so, the current seed set of users is replaced by the new seed set that has the associated greater spread for the current feature set.

By way of a further illustration, each combination of three users other than users in the current seed set may be tested to determine an associated spread using the current feature set, and the largest determined spread relative to the other determined spreads may be compared with the spread associated with the current seed set of users. If the largest determined spread is larger than the spread associated with the current seed set of users, the current seed set of users may be replaced by the new seed set of users associated with the largest determined spread.

As shown in the example of FIG. 4, the procedure ends when the seed budget is reached and no further update of the feature set produces an improvement of the spread, e.g., see line 15 of the example algorithm shown in FIG. 4.

Figure 5:
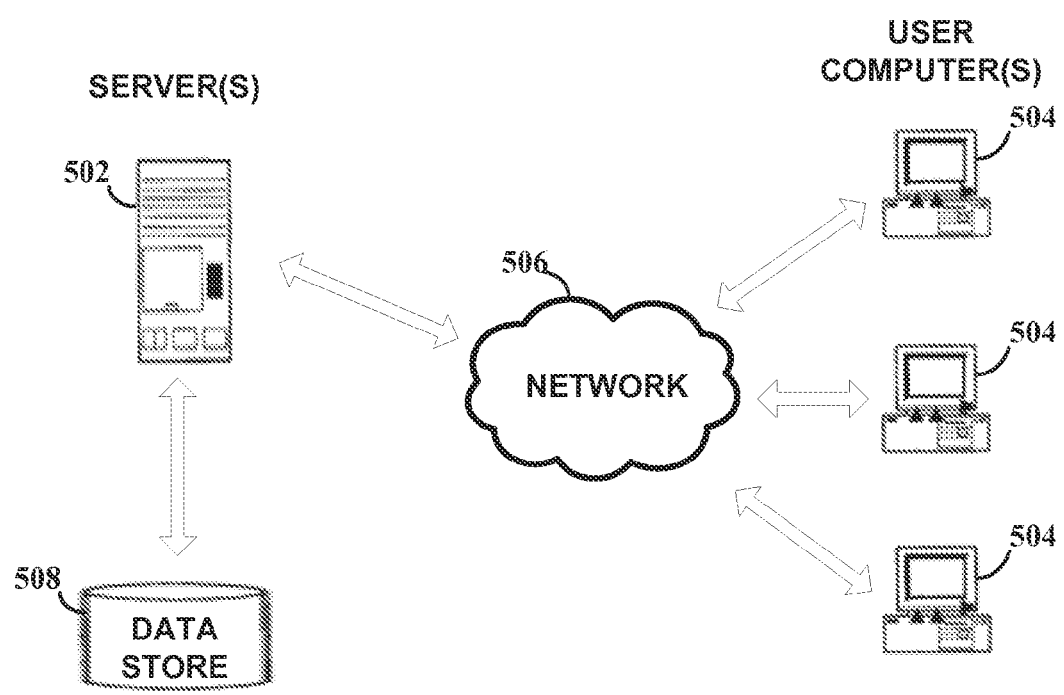
FIG. 5 illustrates some components that can be used in connection with one or more embodiments of the present disclosure.

FIG. 5 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 502 can be configured to execute program code, instructions, etc. to provide functionality in accordance with one or more embodiments of the present disclosure.

Computing device 502 can serve content to user computing devices 504 using a browser application via a network 506. Data store 508 might be used to store program code to configure a server 502 to execute functionality in accordance with one or more embodiments of the present disclosure.

The user computing device 504 may be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computing device 504 can include one or more processors, memory, a removable media reader, network interface, display and interface, and one or more input devices, e.g., keyboard, keypad, mouse, etc. and input device interface, for example. One skilled in the art will recognize that server 502 and user computing device 504 may be configured in many different ways and implemented using many different combinations of hardware, software, or firmware.

In accordance with one or more embodiments, a computing device 502 can make a user interface available to a user computing device 504 via the network 506. The user interface made available to the user computing device 504 can include content items, or identifiers (e.g., URLs) selected for the user interface in accordance with one or more embodiments of the present invention. In accordance with one or more embodiments, computing device 502 makes a user interface available to a user computing device 504 by communicating a definition of the user interface to the user computing device 504 via the network 506. The user interface definition can be specified using any of a number of languages, including without limitation a markup language such as Hypertext Markup Language, scripts, applets and the like. The user interface definition can be processed by an application executing on the user computing device 504, such as a browser application, to output the user interface on a display coupled, e.g., a display directly or indirectly connected, to the user computing device 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 5. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 6:
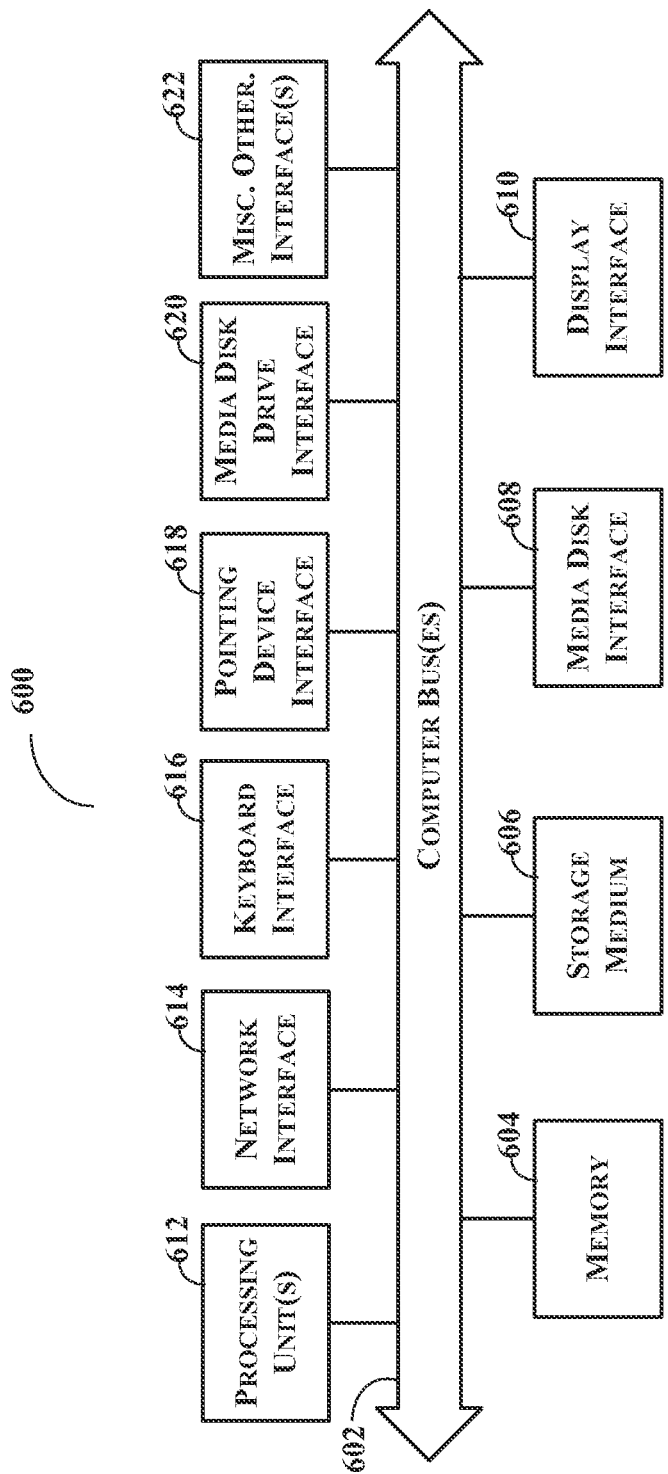
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 502 or user computing device 504, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 620 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:

using, by at least one computing system, a feature-aware propagation model having a set of model parameters in selecting a seed set of users that are members of a social network for influencing other users of the social network in combination with selecting, by the feature-aware propagation model, a product feature set comprising a number of features of a product, the feature-aware propagation model further determining a likelihood of the combination to maximize adoption of the product having the product's product feature set by members of the social network; and identifying, by the at least one computing system, the combination of the user seed set of users and the product feature set for the product selected using the feature-aware propagation model, the user seed set comprising a number of users for influencing other users with respect to the product with its product feature set, the identified combination of the seed set of users that are members of a social network for influencing other users of the social network and the product's product feature set having the determined likelihood to maximize adoption of the product having the product's product feature set by members of the social network that is greater than the determined likelihood corresponding to at least one other combination of user seed set and product feature set considered by the feature-aware propagation model.

2. The method of claim 1, the set of model parameters comprising an influence strength for each of a plurality of user pairings, a part-worth utility for each of a plurality of pairings of a user of the social network and a feature of the product, and a hurdle for each of a plurality of users of the social network, the influence strength proving a measure of a strength of influence of a first user in a user pairing over a second user in the user pairing, the part-worth utility providing a measure of importance of a given product feature to a given user, and a hurdle providing a product adoption equilibrium measure for the given user.

3. The method of claim 2, further comprising:

generating, by the at least one computing system, the set of model parameters using input comprising a social graph representing the social network, information identifying a set of products and a set of features for each product of the set of products and feature preferences and information identifying product and feature preferences of members of the social network.

4. The method of claim 1, the identifying the combination of the user seed and product feature sets determined to have a greater likelihood to maximize adoption of the product having the product feature set by members of the social network further comprising:

performing a plurality of iterations, in each iteration updating one of the user seed set and the product feature set;

in an iteration that updates the user seed set:

determining a spread of influence measure for each user not already a member of the user seed set; and updating the user seed set to include the user not already a member of the user seed set that has the greatest determined spread of influence measure relative to the spread of influence measures determined for the other users not already a member of the user seed set;

in an iteration that updates the product feature set:
determining the spread of influence measure for each of a plurality of product feature updates; and
updating the product feature set using the product feature update of the plurality that has the greatest determined spread of influence measure relative to the spread of influence measures determined for the other product feature updates of the plurality.

5. The method of claim 4, further comprising:
determining the spread of influence measure for each of a plurality of product feature updates comprising, for each product feature not in the product feature set, temporarily adding the product feature to the product feature set and determining a spread of influence measure for the product feature set including the product feature; and
updating the product feature set by adding the product feature having the greatest determined spread of influence measure relative to the spread of influence measures determined for one or more other product features temporarily added to the product feature set.

6. The method of claim 4, further comprising:
determining the spread of influence measure for each of a plurality of product feature updates comprising, for each product feature in the product feature set, temporarily removing the product feature from the product feature set and determining a spread of influence measure for the product feature set excluding the removed product feature; and
updating the product feature set by removing the product feature having the greatest determined spread of influence measure relative to the spread of influence measures determined for one or more other product features temporarily removed from the product feature set.

7. The method of claim 4, further comprising:
in the iteration that updates the product feature set:
determining a spread of influence measure for each of a plurality of alternate user seed sets, each alternate user seed set comprising a number of users equal to the number of users in the user seed set and comprising a set of users selected from a subset of the social network excluding those one or more users in the user seed set;
comparing the spread of influence measure for the user seed set with the spread of influence measure determined for each of the plurality of alternate user seed sets; and
replacing the user seed set with one of the plurality of alternate user seed sets if it is determined that the one of the plurality of alternate user seed sets has an associated spread of influence measure that is greater than the user seed set's spread of influence measure.

8. A system comprising:
at least one computing device, each computing device comprising a processor and a storage medium for tangibly storing thereon program logic for execution by the processor, the stored program logic comprising:
using logic executed by the processor for using a feature-aware propagation model having a set of model parameters in selecting a seed set of users that are members of a social network for influencing other users of the social network in combination with selecting, by the feature-aware propagation model, a product feature set comprising a number of features of a product, the feature-aware propagation model further determining a likelihood of the combination to maximize adoption of the product having the product's product feature set by members of the social network; and
identifying logic executed by the processor for identifying the combination of the user seed set of users and the product feature set for the product selected using the feature-aware propagation model, the user seed set comprising a number of users for influencing other users with respect to the product with its product feature set, the identified combination of the seed set of users that are members of a social network for influencing other users of the social network and the product's product feature set having the determined likelihood to maximize adoption of the product having the product's product feature set by members of the social network that is greater than the determined likelihood corresponding to at least one other combination of user seed set and product feature set considered by the feature-aware propagation model.

9. The system of claim 8, the set of model parameters comprising an influence strength for each of a plurality of user pairings, a part-worth utility for each of a plurality of pairings of a user of the social network and a feature of the product, and a hurdle for each of a plurality of users of the social network, the influence strength proving a measure of a strength of influence of a first user in a user pairing over a second user in the user pairing, the part-worth utility providing a measure of importance of a given product feature to a given user, and a hurdle providing a product adoption equilibrium measure for the given user.

10. The system of claim 9, the stored program logic further comprising:
generating logic executed by the processor for generating the set of model parameters using input comprising a social graph representing the social network, information identifying a set of products and a set of features for each product of the set of products and information identifying product and feature preferences of members of the social network.

11. The system of claim 8, the identifying logic executed by the processor for identifying the combination of the user seed and product feature sets determined to have a greater likelihood to maximize adoption of the product having the product feature set by members of the social network further comprising:
performing logic executed by the processor for performing a plurality of iterations, in each iteration updating one of the user seed set and the product feature set;
in an iteration that updates the user seed set, the stored program logic further comprising:
determining logic executed by the processor for determining a spread of influence measure for each user not already a member of the user seed set; and
updating logic executed by the processor for updating the user seed set to include the user not already a member of the user seed set that has the greatest determined spread of influence measure relative to the spread of influence measures determined for the other users not already a member of the user seed set;
in an iteration that updates the product feature set, the stored program logic-further comprising:

determining logic executed by the processor for determining the spread of influence measure for each of a plurality of product feature updates; and updating logic executed by the processor for updating the product feature set using the product feature update of the plurality that has the greatest determined spread of influence measure relative to the spread of influence measures determined for the other product feature updates of the plurality.

12. The system of claim 11, the stored program logic further comprising:

determining logic executed by the processor for determining the spread of influence measure for each of a plurality of product feature updates by, for each product feature not in the product feature set, temporarily adding the product feature to the product feature set and determine a spread of influence measure for the product feature set including the product feature; and updating logic executed by the processor for updating the product feature set by adding the product feature having the greatest determined spread of influence measure relative to the spread of influence measures determined for one or more other product features temporarily added to the product feature set.

13. The system of claim 11, the stored program logic further comprising:

determining logic executed by the processor for determining the spread of influence measure for each of a plurality of product feature updates comprising, for each product feature in the product feature set, temporarily removing the product feature from the product feature set and determining a spread of influence measure for the product feature set excluding the removed product feature; and updating logic executed by the processor for updating the product feature set by removing the product feature having the greatest determined spread of influence measure relative to the spread of influence measures determined for one or more other product features temporarily removed from the product feature set.

14. The system of claim 11, the stored program logic further comprising:

in the iteration that updates the product feature set:

determining logic executed by the processor for determining a spread of influence measure for each of a plurality of alternate user seed sets, each alternate user seed set comprising a number of users equal to the number of users in the user seed set and comprising a set of users selected from a subset of the social network excluding those one or more users in the user seed set;

comparing logic executed by the processor for comparing the spread of influence measure for the user seed set with the spread of influence measure determined for each of the plurality of alternate user seed sets; and replacing logic executed by the processor for replacing the user seed set with one of the plurality of alternate user seed sets if it is determined that the one of the plurality of alternate user seed sets has an associated spread of influence measure that is greater than the user seed set's spread of influence measure.

15. A computer readable non-transitory storage medium for tangibly storing thereon computer readable instructions that when executed cause at least one processor to:

use a feature-aware propagation model having a set of model parameters in selecting a seed set of users that are members of a social network for influencing other users of the social network in combination with selecting, by the feature-aware propagation model, a product feature set comprising a number of features of a product, the feature-aware propagation model further determining a likelihood of the combination to maximize adoption of the product having the product's product feature set by members of the social network; and identify the combination of the user seed set of users and the product feature set for the product selected using the feature-aware propagation model, the user seed set comprising a number of users for influencing other users with respect to the product with its product feature set, the identified combination of the seed set of users that are members of a social network for influencing other users of the social network and the product's product feature set having the determined likelihood to maximize adoption of the product having the product's product feature set by members of the social network that is greater than the determined likelihood corresponding to at least one other combination of user seed set and product feature set considered by the feature-aware propagation model.

16. The computer readable non-transitory storage medium of claim 15, the set of model parameters comprising an influence strength for each of a plurality of user pairings, a part-worth utility for each of a plurality of pairings of a user of the social network and a feature of the product, and a hurdle for each of a plurality of users of the social network, the influence strength proving a measure of a strength of influence of a first user in a user pairing over a second user in the user pairing, the part-worth utility providing a measure of importance of a given product feature to a given user, and a hurdle providing a product adoption equilibrium measure for the given user.

17. The computer readable non-transitory storage medium of claim 16, the instructions further comprising instructions to:

generate the set of model parameters using input comprising a social graph representing the social network, information identifying a set of products and a set of features for each product of the set of products and information identifying product and feature preferences of members of the social network.

18. The computer readable non-transitory storage medium of claim 15, the instructions to the combination of the user seed and product feature sets determined to have a greater likelihood to maximize adoption of the product having the product feature set by members of the social network further comprising instructions to:

perform a plurality of iterations, in each iteration updating one of the user seed set and the product feature set;

in an iteration that updates the user seed set, the instructions further comprising instructions to:

determine a spread of influence measure for each user not already a member of the user seed set; and update the user seed set to include the user not already a member of the user seed set that has the greatest determined spread of influence measure relative to the spread of influence measures determined for the other users not already a member of the user seed set;

in an iteration that updates the product feature set, the instructions further comprising instructions to:

determine the spread of influence measure for each of a plurality of product feature updates; and update the product feature set using the product feature update of the plurality that has the greatest determined spread of influence measure relative to the spread of influence measures determined for the other product feature updates of the plurality.

19. The computer readable non-transitory storage medium of claim 18, the instructions further comprising instructions to:
  determine the spread of influence measure for each of a plurality of product feature updates by, for each product feature not in the product feature set, temporarily adding the product feature to the product feature set and determine a spread of influence measure for the product feature set including the product feature; and
  update the product feature set by adding the product feature having the greatest determined spread of influence measure relative to the spread of influence measures determined for one or more other product features temporarily added to the product feature set.

20. The computer readable non-transitory storage medium of claim 18, the instructions further comprising instructions to:
  determine the spread of influence measure for each of a plurality of product feature updates comprising, for each product feature in the product feature set, temporarily removing the product feature from the product feature set and determining a spread of influence measure for the product feature set excluding the removed product feature; and
  update the product feature set by removing the product feature having the greatest determined spread of influence measure relative to the spread of influence measures determined for one or more other product features temporarily removed from the product feature set.

21. The computer readable non-transitory storage medium of claim 18, the instructions further comprising instructions to:
  in the iteration that updates the product feature set:
  determine a spread of influence measure for each of a plurality of alternate user seed sets, each alternate user seed set comprising a number of users equal to the number of users in the user seed set and comprising a set of users selected from a subset of the social network excluding those one or more users in the user seed set;
  compare the spread of influence measure for the user seed set with the spread of influence measure determined for each of the plurality of alternate user seed sets; and
  replace the user seed set with one of the plurality of alternate user seed sets if it is determined that the one of the plurality of alternate user seed sets has an associated spread of influence measure that is greater than the user seed set's spread of influence measure.

* * * * *